US010071529B2

(12) United States Patent
Nettis et al.

(10) Patent No.: US 10,071,529 B2
(45) Date of Patent: Sep. 11, 2018

(54) METHOD OF FABRICATING A PRESSURE VESSEL USING A VARIABLE VISCOSITY SOLVENTLESS PREPOLYMER FORMULATION

(75) Inventors: Francesco Nettis, London (GB); Brian Spencer, Sacramento, CA (US); Zachary Spencer, Sacramento, CA (US)

(73) Assignee: BLUE WAVE CO S.A., Luxembourg (LU)

( * ) Notice: Subject to any disclaimer, the term of this patent is extended or adjusted under 35 U.S.C. 154(b) by 664 days.

(21) Appl. No.: 14/362,536

(22) PCT Filed: Dec. 5, 2011

(86) PCT No.: PCT/EP2011/071808
§ 371 (c)(1),
(2), (4) Date: Feb. 27, 2015

(87) PCT Pub. No.: WO2013/083172
PCT Pub. Date: Jun. 13, 2013

(65) Prior Publication Data
US 2015/0167891 A1    Jun. 18, 2015

(51) Int. Cl.
*B29C 70/08* (2006.01)
*F17C 1/00* (2006.01)
(Continued)

(52) U.S. Cl.
CPC .......... *B29C 70/088* (2013.01); *B29C 70/086* (2013.01); *B29C 70/32* (2013.01); *B32B 37/142* (2013.01); *B32B 37/24* (2013.01); *B63B 25/14* (2013.01); *C08L 45/00* (2013.01); *F17C 1/002* (2013.01); *F17C 1/06* (2013.01);
(Continued)

(58) Field of Classification Search
None
See application file for complete search history.

(56) References Cited

U.S. PATENT DOCUMENTS 4,426,502 A * 1/1984 Minchak ............. C08G 61/08
526/161
4,906,797 A    3/1990 Lane et al.
(Continued)

FOREIGN PATENT DOCUMENTS

CA    2290008 A1    6/2000
EP    0547330 A2    6/1993
(Continued)

OTHER PUBLICATIONS

International Search Report and Written Opinion for PCT/US2012/067613, dated Mar. 15, 2013 (5 pp.).
(Continued)

*Primary Examiner* — Michael P. Rodriguez
(74) *Attorney, Agent, or Firm* — Squire Patton Boggs (US) LLP

(57) ABSTRACT

This invention relates to methods of fabricating components of a pressure vessel using a dicyclopentadiene prepolymer formulation in which the purity of the dicyclopentadiene is at least 92% wherein the formulation further comprises a reactive ethylene monomer that renders the prepolymer formulation flowable at ambient temperatures and to pressure vessels that are fabricated by said methods.

8 Claims, 2 Drawing Sheets

(51) Int. Cl.
  *B29C 70/32* (2006.01)
  *B32B 37/14* (2006.01)
  *B32B 37/24* (2006.01)
  *B63B 25/14* (2006.01)
  *C08L 45/00* (2006.01)
  *F17C 1/06* (2006.01)
  *F17C 1/16* (2006.01)
  *B29L 31/00* (2006.01)
  *B29C 53/82* (2006.01)
  *B29C 53/58* (2006.01)
  *B29C 53/60* (2006.01)

(52) U.S. Cl.
  CPC .............. *F17C 1/16* (2013.01); *B29C 53/588* (2013.01); *B29C 53/602* (2013.01); *B29C 53/822* (2013.01); *B29L 2031/7156* (2013.01); *B32B 2037/243* (2013.01); *B32B 2439/00* (2013.01); *F17C 2201/0109* (2013.01); *F17C 2201/0119* (2013.01); *F17C 2201/0128* (2013.01); *F17C 2201/0133* (2013.01); *F17C 2203/0604* (2013.01); *F17C 2203/0636* (2013.01); *F17C 2203/0656* (2013.01); *F17C 2203/0663* (2013.01); *F17C 2203/0673* (2013.01); *F17C 2203/0675* (2013.01); *F17C 2209/2154* (2013.01); *F17C 2221/012* (2013.01); *F17C 2221/013* (2013.01); *F17C 2221/014* (2013.01); *F17C 2221/033* (2013.01); *F17C 2221/037* (2013.01); *F17C 2223/0123* (2013.01); *Y02E 60/321* (2013.01); *Y10T 428/1352* (2015.01); *Y10T 428/1355* (2015.01)

(56) References Cited

U.S. PATENT DOCUMENTS

| | | | |
|---|---|---|---|
| 4,981,931 A | | 1/1991 | Bell |
| 5,098,750 A | | 3/1992 | Ueno et al. |
| 5,391,670 A | * | 2/1995 | Biswas ................ C08G 61/02 525/133 |
| 6,310,121 B1 | | 10/2001 | Woodson et al. |
| 2002/0172787 A1 | * | 11/2002 | Warner ................. C08G 61/08 428/36.3 |
| 2010/0075200 A1 | * | 3/2010 | Hatta ................... B29C 45/006 429/443 |
| 2010/0201472 A1 | | 8/2010 | Le et al. |
| 2010/0305269 A1 | | 12/2010 | Gleich et al. |

FOREIGN PATENT DOCUMENTS

| | | |
|---|---|---|
| EP | 0872521 A1 | 10/1998 |
| JP | 2004-331798 A | 11/2004 |
| JP | 11-206933 A | 10/2011 |
| WO | WO 2011/144234 | 11/2011 |

OTHER PUBLICATIONS

International Search Report for Application No. PCT/EP2011/071808, dated Aug. 16, 2012 (5 pages).

\* cited by examiner

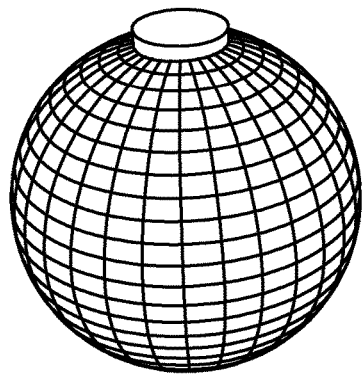
Figure 1A
Figure 1B
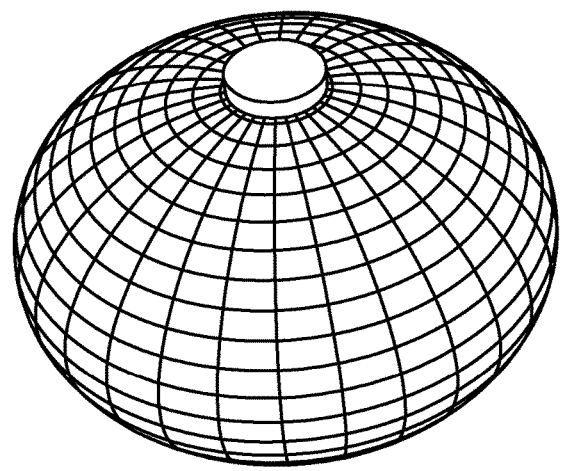
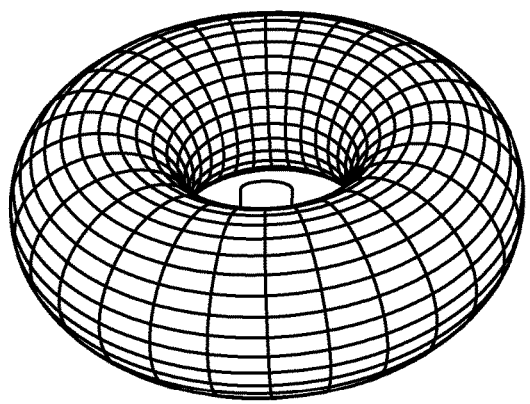
Figure 1C

METHOD OF FABRICATING A PRESSURE VESSEL USING A VARIABLE VISCOSITY SOLVENTLESS PREPOLYMER FORMULATION

FIELD

This invention relates to a method of fabricating a pressure vessel using a prepolymer formulation, the viscosity of which can be modified by addition of co-monomer to achieve desired operational conditions, in particular to a dicyclopentadiene prepolymer to which is added a reactive ethylene co-monomer.

BACKGROUND

The detrimental effects of the burning of fossil fuels on the environment are becoming more and more of a concern and have spurred great interest in alternative energy sources. While progress is being made with solar, wind, nuclear, geothermal, and other energy sources, it is quite clear that the widespread availability of economical alternate energy sources, in particular for high energy use applications, remains an elusive target. In the meantime, fossil fuels are forecast to dominate the energy market for the foreseeable future. Among the fossil fuels, natural gas is the cleanest burning and therefore the clear choice for energy production. There is, therefore, a movement afoot to supplement or supplant, as much as possible, other fossil fuels such as coal and petroleum with natural gas as the world becomes more conscious of the environmental repercussions of burning fossil fuels. Unfortunately, much of world's natural gas deposits exist in remote, difficult to access regions of the planet. Terrain and geopolitical factors render it extremely difficult to reliably and economically extract the natural gas from these regions. The use of pipelines and overland transport has been evaluated, in some instances attempted, and found to be uneconomical. Interestingly, a large portion of the earth's remote natural gas reserves is located in relatively close proximity to the oceans and other bodies of water having ready access to the oceans. Thus, marine transport of natural gas from the remote locations would appear to be an obvious solution. The problem with marine transport of natural gas lies largely in the economics. Ocean-going vessels can carry just so much laden weight and the cost of shipping by sea reflects this fact, the cost being calculated on the total weight being shipped, that is, the weight of the product plus the weight of the container vessel in which the product is being shipped. If the net weight of the product is low compared to the tare weight of the shipping container, the cost of shipping per unit mass of product becomes prohibitive. This is particularly true of the transport of compressed fluids, which conventionally are transported in steel cylinders that are extremely heavy compared to weight of contained fluid. This problem has been ameliorated somewhat by the advent of Type III and Type IV pressure vessels. Type III pressure vessels are comprised of a relatively thin metal liner that is wound with a filamentous composite wrap, which results in a vessel with the strength of a steel vessel at a substantial saving in overall vessel weight. Type IV pressure vessels comprise a polymeric liner that is likewise wrapped with a composite filamentous material. Type IV pressure vessels are the lightest of all the presently approved pressure vessels. The use of Type III and Type IV vessels coupled with the trend to make these vessels very large—cylindrical vessels 18 meters in length and 2.5-3.0 meters in diameter are currently being fabricated and vessel 30 or more meters in length and 6 or more meters in diameter are contemplated—has resulted in a major step forward in optimizing the economics of ocean transport of compressed fluids.

The trend to make Type III and Type IV pressure vessels very large carries with it a unique set of challenges, one of which relates to the conditions under which prepolymer formulations appropriate for use in such pressure vessels can be cured to form the final product, be it a pressure vessel liner, a composite over-wrap, a composite dome on a cylindrical pressure vessel or a composite boss for fitting a pressure vessel to external paraphernalia for loading and unloading fluids from the pressure vessel. That is, polymers suitable for use in the manufacture of a pressure vessel must have the strength to withstand high operating pressures, must have adequate impact resistance to minimize chances of catastrophic failure on inadvertent impact, must be essentially impermeable and inert to compressed fluids contained in the vessels and should have as broad a range as possible of operating temperatures under which the vessel can be safely used.

A currently preferred polymeric material that exhibits such performance characteristics is high density polyethylene (HDPE). The problem with HDPE is the cure conditions that must be used to form the polymeric end product. That is, HDPE must generally be cured at temperatures in excess of 450° F. to obtain pressure vessel liners and composite over-wraps, the two uses for which it is currently in use. While this is not a great problem for the manufacture of small vessels, when the size of the construct to be cured is increased to the dimensions contemplated for marine transport of fluids such a compressed natural gas (CNG)—pressure vessels 3 meter in diameter and 18 meters in length are currently being produced and vessel over 6 meters in diameter and over 30 meters in length are contemplated, the sheer magnitude of the required curing facility that can contain the construct in a controlled high temperature environment and the cost of operation become prohibitive.

What is needed is a high performance, variable viscosity, variable cure temperature (in particular low temperature cure) prepolymer formulation for use in the fabrication of polymeric pressure vessels. The present invention provides such a prepolymer formulation.

SUMMARY

Thus, in one aspect the present invention relates to a method of fabricating a pressure vessel, comprising:
providing a vessel liner;
winding a filamentous material onto the vessel liner, wherein:
the filamentous material is impregnated with a prepolymer composition prior to being wound onto the vessel liner, or
the filamentous material is dry-wound onto the vessel liner and is then impregnated with a prepolymer composition;
wherein:
the prepolymer composition comprises dicyclopentadiene that is at least 92% pure, a reactive ethylene monomer and a curing catalyst, the reactive ethylene monomer comprising a weight percentage of the total monomer content of the prepolymer composition such that the prepolymer composition has a preselected viscosity at a preselected deposition temperature; and curing the impregnated, wound filamentous material to form a polymeric composite.

In an aspect of this invention, the vessel liner comprises a metal, a ceramic, a thermoplastic polymer or a thermoset polymer.

An aspect of this invention comprises a method of fabricating a pressure vessel liner, comprising:
providing a form having a surface in the desired shape of the pressure vessel liner;
depositing onto the surface of the form a prepolymer composition comprising dicyclopentadiene that is at least 92% pure, a reactive ethylene monomer and a curing catalyst, wherein:
the reactive ethylene monomer comprises a weight percentage of the total monomer content of the prepolymer composition such that the prepolymer composition has a preselected viscosity at a preselected temperature; and
curing the deposited prepolymer composition to form the polymeric pressure vessel liner.

In an aspect of this invention, the pressure vessel first set forth above further comprises the pressure vessel liner set forth immediately above.

In an aspect of this invention, the reactive ethylene monomer comprises from about 1 wt % to about 10 wt % of the total monomer content of the prepolymer composition.

In an aspect of this invention, the reactive ethylene monomer comprises unsubstituted or substituted norbornene.

In an aspect of this invention, the substituted norbornene is a 5-alkyl norbornene.

In an aspect of this invention, the 5-alkyl moiety is selected from the group consisting of 1C-12C straight or branched chain alkyls.

In an aspect of this invention, the straight chain alkyl is selected from hexyl or decyl.

In an aspect of this invention, the preselected deposition temperature is 70° F. to 75° F. and the amount of 5-hexylnorbornene or 5-decylnormbornene is 4 wt % to 6 wt % of the total monomer content of the prepolymer composition.

In an aspect of this invention, the curing catalyst is selected from the group consisting of ROMP catalysts.

In an aspect of this invention, the impregnated filamentous material comprises 10 vol % to 90 vol % of the deposited prepolymer composition.

In an aspect of this invention, the filamentous material is selected from the group consisting of glass filament, carbon filament, aramid filament and ultra high molecular weight polyethylene filament.

An aspect of this invention is a pressure vessel fabricated by any any combination of the above methods.

DETAILED DESCRIPTION

BRIEF DESCRIPTION OF THE FIGURES

FIG. 1 shows isometric projections of various types of pressure vessels.
FIG. 1A shows a spherical pressure vessel.
FIG. 1B shows and oblate spheroid pressure vessel.
FIG. 1C shows a toroidal pressure vessel.

DISCUSSION

It is understood that, with regard to this description and the appended claims, any reference to any aspect of this invention made in the singular includes the plural and vice versa unless it is expressly stated or unambiguously clear from the context that such is not intended.

As used herein, any term of approximation such as, without limitation, near, about, approximately, substantially, essentially and the like, mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the term of approximation. In general, but with the preceding discussion in mind, a numerical value herein that is modified by a word of approximation may vary from the stated value by ±10%, unless expressly stated otherwise.

As used herein, "impermeable" or "impervious" refers to the property of a substance that renders it substantially impossible for a fluid to penetrate to any significant degree into a surface formed of the first substance.

As used herein, "inert" refers to the property of a substance that renders a surface formed of the substance unreactive toward any components of a fluid that may be contacted with the surface.

As used herein, the use of "preferred," "preferably," or "more preferred," and the like refers to preferences as they existed at the time of filing of this patent application.

As used herein, a "fluid" refers to a gas, a liquid or a mixture of gas and liquid. For example, without limitation, natural gas as it is extracted from the ground and transported to a processing center is often a mixture of the gas with liquid contaminants. Such mixture would constitute a fluid for the purposes of this invention.

Figure 1D:
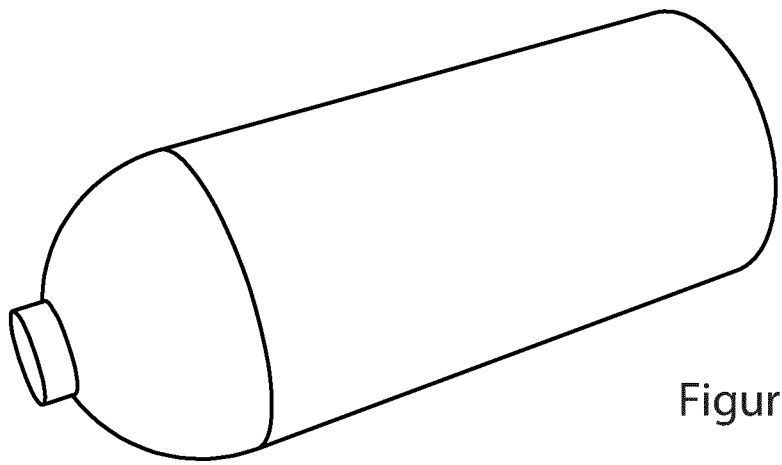
FIG. 1D shows a pressure vessel with a cylindrical center section and one domed end section.
Figure 1E:
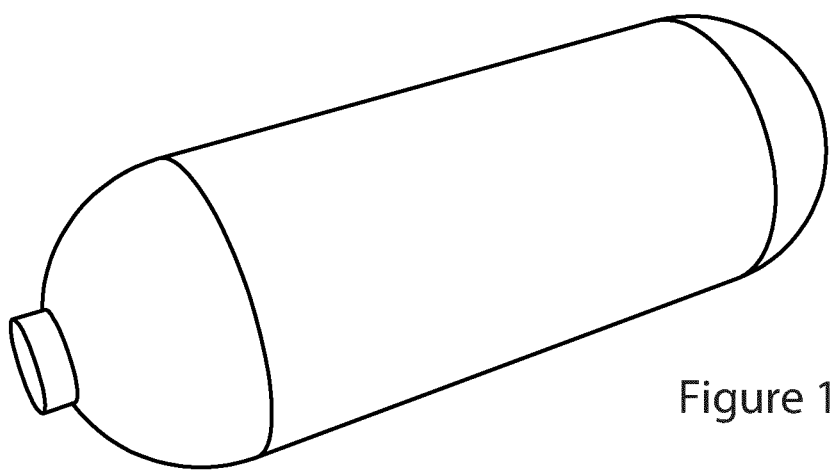
FIG. 1E shows a pressure vessel with a cylindrical center section and two domed end sections.

As used herein, a "wrap" or "over-wrap" refers to the winding of a filamentous material around a construct, which may be, without limitation, cylindrical, geodesic, toroidal, spherical, oblate spheroidal, etc. as illustrated in FIG. 1. The filamentous material may be wound around the construct in a dry state and left as such or it may subsequently be impregnated with and embedded in polymeric matrix. Alternatively, the filamentous material may be impregnated with a polymeric matrix prior to being wound onto a construct in which case it also becomes embedded in excess matrix material.

All technical terminology is intended to have the meaning that would be afforded such terminology by those skilled in the relevant art unless it is expressly stated or obvious from the language or context that a different meaning is intended.

Pressure vessels for the transport of compressed fluids, such as compressed natural gas, CNG, presently constitute four regulatory agency approved classes, all of which are cylindrical with one or two domed ends:

Type I. Comprises an all metal, usually aluminum or steel construct. This type of vessel is inexpensive but is very heavy in relation to the other classes of vessels. Although Type I pressure vessels currently comprise a large portion of the containers used to ship compressed fluids by sea, their use in marine transport incurs very tight economic constraints.

Type II. Comprises a thinner metal cylindrical center section with standard thickness metal end domes in which only the cylindrical portion is reinforced with a composite wrap. The composite wrap generally constitutes glass or carbon filament impregnated with a polymer matrix. The composite is usually "hoop wrapped" around the middle of the vessel. The domes at one or both ends of the vessel are not composite wrapped. In Class II pressure vessels, the metal liner carries about 50% of the stress and the composite carries about 50% of the stress resulting from the internal pressure of the contained compressed fluid. Class II vessels are lighter than Class I vessels but are more expensive.

Type III. Comprises a thin metal liner comprises the entire structure wherein the liner is reinforced with a filamentous composite wrap around entire vessel. The stress in Type III vessels is shifted virtually entirely to the filamentous material of the composite wrap; the liner need only withstand a small portion of the stress. Type III vessels are much lighter than type I or II vessels but are substantially more expensive.

Type IV. Comprises a polymeric essentially gas-tight liner is fully wrapped with a filamentous composite. The composite wrap provides the entire strength of the vessel. Type IV vessels are by far the lightest of the four approved classes of pressure vessels but are also the most expensive.

In addition to the four approved classes of pressure vessels, a new vessel construct involves a single polymeric layer that is comprised of two sub-layers, an inner sub-layer that is in contact with the contained fluid and an outer sub-layer that has a filamentous material embedded in it to form a composite. The key feature of this type of pressure vessel, generally referred to herein as Type V, is that the matrix polymer that forms both the polymer-only inner sub-layer and composite outer sub-layer is throughout indistinguishable on a macro and on a molecular scale: it appears as a single continuous layer of polymer, a portion of which is impregnated with the filamentous material and a portion of which is not.

The method of this invention may be used in the fabrication of current Type II, Type III and Type IV pressure vessels and also Type V pressure vessels, as well as any subsequent pressure vessel construct that might be approved and that includes at least one layer of polymeric material.

As used herein, a "pressure vessel" refers to any closed container designed to hold fluids at a pressure substantially different from ambient pressure. In particular at present, it refers to such containers used to hold and transport CNG. Pressure vessels may take a variety of shapes but most often seen in actual use are spherical, oblate spheroidal, toroidal and cylindrical center section vessels with domed end sections at either or both ends. Non-limiting illustrations of such vessel are shown in FIG. 1.

Currently approved Type I, II, Ill and IV pressure vessels are cylindrical with one or two domed end sections.

For the purpose of this disclosure, a pressure vessel comprising a cylindrical center section with one or two domed end sections will be referred to simply as a "cylindrical" pressure vessel. Vessel size may also vary tremendously and the construct and methods of this invention may be applied to a vessel of any size.

In a presently preferred embodiment, the prepolymer and methods of this invention are used to fabricate very large pressure vessels such as the currently existing 18 meter long and 2.5 meter diameter vessels as well as anticipated vessels in excess of 30 meters in length and 6 meters or more in diameter.

The prepolymer may also be used to fabricate substantially smaller vessels, such as laboratory gas cylinders, both free-standing and bench top, and vessels for use in alternative energy vehicles.

A pressure vessel fabricated using the method of this invention may consist of a liner fabricated using a prepolymer of this invention or any other material currently in use for the fabrication of pressure vessels as well as any material that may be developed in the future for such use. For the latter vessels, the prepolymer formulation of this invention can be used to prepare the over-wrap composite that forms the outer layer of the vessel, the dome(s) if applicable and the boss(es) if desired.

Current pressure vessel liner materials include, without limitation, polymers such as high density polyethylene, polypropylene and polyethylene terephthalate, ceramics such as alumina, silicon carbide, silicon nitride and zirconia and metals such as stainless steel, titanium, nickel alloys, aluminum, copper, zinc, tin. Preferred at present are polymeric liners that ultimately give rise to Type IV and Type V pressure vessels.

Both thermoplastic and thermoset polymers have been used to form pressure vessel liners and any of these may be used in the present invention when a composite over-wrap of this invention is also used.

Of the polymeric materials suitable as a pressure vessel liner, presently preferred is polydicyclopentadiene (pDCPD).

pDCPD is a thermoset polymer that has superior physical properties in comparison to currently used polymers for pressure vessel liners, in particular HDPE, the most common liner polymer at present. That is, pDCPD is substantially less permeable to pressurized gasses such as, without limitation, CNG and hydrogen. pDCPD also exhibits far better impact resistance than HDPE. pDCPD pressure vessels also have a substantially broader operating temperature range that extends from about 0.5° K (liquid helium) to about 120° C., whereas HDPE is limited to operational temperatures of about −40° C. to about 60° C.

Perhaps most notably, pDCPD can be cured at temperatures well below that of HDPE, that is, from about 70° F. to about 250° F. compared to 450° F. and above for HDPE. The only problem with using pDCPD at these lower temperatures is that the presently preferred dicyclopentadiene, DCPD, monomer that provides the constitutional unit of pDCPD, is, at the presently preferred purity for use in the prepolymer formulation of this invention, a thick liquid approaching a gel-like consistency at the lower, and therefore presently preferred, end of the processing temperature spectrum.

For the purposes of this invention, although DCPD is formally a dimer, it will be considered and treated herein as a monomer for the purposes this discussion and the appended claims. Thus, with regard to a prepolymer formulation, the "total monomer content" refers to the amount of a reactive ethylene monomer and the DCPD monomer.

Of course, if more than one reactive ethylene monomer is used, the total monomer content would include the quantity of that monomer also.

It is presently preferred that the DCPD in a prepolymer formulation of this invention be at least 92% pure, and preferable at present at least 98% pure.

The viscosity of high purity DCPD could, of course, be adjusted by the addition of solvents but this engenders problems of its own. In the first place, the use of solvents in any system is currently discouraged for environmental, health and safety reasons. However, with regard specifically to the fabrication of pressure vessels, the eventual removal of the solvent can lead to structural defects in the resulting construct such as bubbles, pinholes and the like which could lead to untimely failure of the pressure vessel.

This invention circumvents these problems by diluting the DCPD with a reactive ethylene monomer, which lowers the viscosity of the prepolymer formulation to useful levels for the fabrication and curing of pressure vessels at low temperatures. Further it becomes an integral part of the final copolymer so that nothing has to be removed from the cured construct.

As used herein, a reactive ethylene monomer refers to a small molecule that contains at least one ethylenic, i.e., —C═C—, bond that is capable of reacting with DCPD under the preferred conditions for DCPD polymerization herein and that is a flowable liquid at the desired operating temperature of the DCPD prepolymer formulation. That is, blending a selected quantity of the reactive ethylene monomer with DCPD results in a prepolymer formulation that is less viscous than the pure DCPD at the selected fabrication temperature. Therefore it is more amenable to application to or deposition into a mold to form a vessel liner or to use in the formation of a composite over-wrap on a vessel liner.

As used herein, a "prepolymer formulation" refers to a blend of at least 92% pure DCPD with one or more reactive ethylene monomer(s), a polymerization initiator or curing agent plus any other desirable additives prior to curing.

A key parameter that must be considered when preparing a prepolymer formulation of this invention is, of course, the desired processing temperature. By "processing temperature" is meant the temperature at which the prepolymer formulation will be, without limitation, formed into a pressure vessel liner or a composite over-wrap.

It is understood that, when used herein, the terms "applied" and "deposited" cover all manners of disposing the prepolymer formulation onto or into a mold or onto a liner and includes, without limitation, coating, spraying, painting, dipping, injection, pressure injection, vacuum assisted pressure injection and the like.

A presently preferred processing temperature is ambient or room temperature so that special temperature controlled environs can be avoided, an exceedingly beneficial objective especially when dealing with very large pressure vessels such as those described earlier.

Once an operating temperature is selected, a desired formulation viscosity at that temperature can be determined. The viscosity will vary depending on, without limitation, the intended thickness of the coating on the mold if a liner is being formed or the thickness of a composite over-wrap to be applied over a liner. The thicker the desired polymer layer, the thicker, i.e., the more viscous, the formulation might want to be.

With an operating temperature and the preferred viscosity in hand, an appropriate catalyst capable of curing the prepolymer to a polymeric final state at the selected curing temperature, which generally is the same as the selected prepolymer application or deposition temperature, can be selected. Although any known mechanism for polymerizing ethylenic monomers can be used with the prepolymer composition of this invention, the presently preferred polymerization mechanism for DCPD is ring opening metathesis polymerization (ROMP).

Useful ROMP catalysts include any standard olefin metathesis catalysts. Typical of such catalysts are, without limitation, Tebbe's reagent, a titanocene-based catalyst, Schrock tungsten, molybdenum and ruthenium catalysts and Grubbs ruthenium catalyst.

The list of possible catalysts is large and the selection of the proper catalyst will depend on the selected deposition timing and curing conditions. Deposition timing should be considered because polymerization may occur too fast for the selected process. For example, without limitation, if it is determined that the composite is to be wrapped using pre-impregnated filamentous material, the process requires running the filamentous material through a reservoir of the prepolymer formulation, which includes the polymerization catalyst. Clearly, if polymerization takes place too rapidly, the reservoir will solidify and become useless before the filamentous material can all be impregnated with the prepolymer formulation and applied to the pressure vessel liner. The proper selection of a catalyst will avoid this problem.

It may be desirable to add a polymerization rate modifying agent to the prepolymer formulation to slow the rate.

Those skilled in the art will be readily able to select an appropriate catalyst based on the disclosure herein.

Operating temperature, viscosity and catalyst having been selected, another choice to be made in preparing the prepolymer formulation is selection of the reactive ethylene monomer. While numerous reactive ethylene monomers usable with this invention will be immediately recognizable to those skilled in the art based on the disclosure herein, and while any and all such monomers are within the scope of this invention, presently preferred monomers are norbornenes, in particular, alkylnorbornenes such as, without limitation, 5-alkylnorbornenes. Most preferred at present are 5-hexyl- and 5-decyl- norbornene.

Having established a processing temperature, a viscosity and a catalyst and a reactive ethylene monomer, all that remains to be determined is how much of the reactive ethylene monomer to blend with the DCPD to achieve the desired viscosity at the selected temperature. The amount of reactive ethylene monomer is not particularly limited, the only critical factor being its effect on the physical properties of the copolymer formed. That is, the properties of pDCPD that render it particularly useful for the fabrication of virtually any component of a pressure vessel must not be compromised. In order to achieve this goal, it is presently preferred that the amount of reactive ethylene monomer is generally in the range of 0.1 to 10 weight percent (wt %) of the total monomer content of the prepolymer composition.

It is understood that the order of parameter and component choices above is exemplary only and is not intended nor should it be construed as limiting the scope of this invention in any manner. For example, if desired a specific reactive ethylene monomer may be the first parameter considered, etc.

As a non-limiting example of a prepolymer formulation for use at a particular operating temperature for fabrication of a particular pressure vessel component, e.g. a liner, DCPD can be blended with about 4 wt % to about 6 wt % of 5-hexylnorbornene or 5-decylnorbornene and about 0.03 to 0.0003 mol % of catMETium RF2 catalyst (Evonik Industries, Essen Germany) based on the moles of DCPD present to give a prepolymer formulation that will afford a liner with a thickness of at least 0.0125 inches.

As mentioned above, if desired, a polymerization rate modifier may be added to the prepolymer composition for the purpose, without limitation, of inhibiting polymerization during formation of a composite by running a filamentous material through a reservoir of the prepolymer formulation. Such rate modifiers include, without limitation, triphenylphosphate.

In addition, if desired, an antioxidant may be included in the prepolymer composition. Useful antioxidants include, without limitation, hindered phenols, secondary aromatic amines, phosphites, phosphonates, dithiophosphonates and sulfur-containing organic compounds.

Other excipients that may occur to those skilled in the art as being beneficial to the formulation and/or final copolymeric composite herein may also be added to the prepolymer formulation. Prepolymer formulations containing any such added materials are within the scope of this invention.

The above discussion relates primarily to the fabrication of a pressure vessel liner. The same teachings can, however, be applied to the formation of a composite outer layer of a pressure vessel, which outer layer can be applied over the above liner or a liner made of virtually any other material known or that may become known as useful as a pressure vessel liner.

It is presently preferred that the same prepolymer composition used for the liner, that is, DCPD, the same reactive ethylene monomer and the same catalyst be used as the matrix polymer for the composite outer layer. The weight percents of the components of the prepolymer formulation may vary depending on the technique selected for forming the composite outer layer but such calculations will be easily performed by those skilled in the art based on the disclosure herein.

The composite outer layer comprises a filamentous material embedded in a matrix polymer, which preferably at present comprises DCPD/reactive ethylene monomer copolymer.

With regard to filamentous material, any known material with the requisite strength properties or any such material that may become known in the future to have the requisite characteristics may be used as the filamentous material component of the polymeric composite. Such filamentous materials presently include, without limitation, natural (silk, hemp, flax, etc.), metal, ceramic, basalt and synthetic polymer fibers and filaments. Currently preferred are glass filaments, e.g., fiberglass, carbon filaments, aramid filaments, sometimes referred to by the trade name Kevlar® and ultra-high molecular weight polyethylene filaments, such as those sold under the tradenames Spectra® (Honeywell Corporation) and Dyneeva® (Royal DSM N.V.). Combinations of these filamentous materials may also be used.

A particular advantage of this invention and its ability to substantially vary the viscosity of the prepolymer composition is that a very high filamentous material volume percent (vol %) composite may be formed. That is, a composite comprising from about 10 vol % to about 90 vol % filamentous material can be created by adjusting the viscosity of the prepolymer composition to assure complete impregnation of the filamentous material with the prepolymer and effective embedding of the filamentous material in the prepolymer composition.

The filamentous material may be embedded in the matrix polymer in two ways, pre-impregnation and dry winding. In the former, the filamentous material is drawn through a reservoir of the matrix polymer and then wound around the liner. In the latter, the filamentous material is dry-wound around the liner and then a layer of the matrix polymer is applied over the fully wound construct.

The equipment and techniques for each procedure are well-known in the art and need not be described in detail herein.

If the pressure vessel is spherical or an oblate spheroid, the entire vessel can be wound with the filamentous material in an isotensoidal pattern. If the pressure vessel is cylindrical, the vessel may be wound isotensoidally only or it may be hoop-wound in its cylindrical section and isotensoidally wound in both its cylindrical and its domed end-cap sections.

A cylindrical Type II pressure vessel, which may benefit from this invention, is generally only hoop-wound around its cylindrical portion, the domed ends generally not being covered with the composite material.

By "isotensoidal" is meant that each filament of the wrap experiences a constant pressure at all points in its path.

As mentioned previously, the term "wrap" or "over-wrap" is used herein to describe the end result of winding of a filamentous material around a pressure vessel shell.

Isotensoidal winding—or an isotensoidal wrap—is currently considered to be the optimal design for a cylindrical composite pressure vessel because, in this configuration, virtually the entire stress imposed on the vessel by a contained fluid under pressure, such as CNG, is absorbed by the filaments of the composite with very little of the stress being assumed by the polymeric matrix.

"Hoop-wound" refers to the winding of a filamentous material around a vessel liner in a circumferential pattern.

Both isotensoidal and hoop winding are well-known to those skilled in the art of Type II, Type III and Type IV pressure vessels and need not be further described here.

While a pressure vessel of this application can contain virtually any fluid so long that the matrix polymer of the vessel liner is selected to be inert to and impenetrable to the fluid, a presently preferred use of a pressure vessel herein is for the containment and transport of natural gas, often in the form of "compressed natural gas" or simply "CNG."

CNG may be contained and transported in the vessels of this invention both as a purified gas and as "raw gas." Raw gas refers to natural gas as it comes, unprocessed, directly from the well. It contains, of course, the natural gas (methane) itself but also may contain liquids such as condensate, natural gasoline and liquefied petroleum gas.

Water may also be present as may other gases, either in the gaseous state or dissolved in the water, such as nitrogen, carbon dioxide, hydrogen sulfide and helium. Some of these may be reactive in their own right or may be reactive when dissolved in water, such as carbon dioxide which produces an acid when dissolved in water.

The presently preferred liner polymer, dicyclopentadiene, has excellent properties with regard to chemical resistance to the above, and other materials that might constitute raw gas.

The pressure vessels described herein can carry a variety of gases, such as raw gas straight from a bore well, including raw natural gas, e.g. when compressed—raw CNG or RCNG, or H2, or CO2 or processed natural gas (methane), or raw or part processed natural gas, e.g. with CO2 allowances of up to 14% molar, H2S allowances of up to 1,000 ppm, or H2 and CO2 gas impurities, or other impurities or corrosive species. The preferred use, however, is CNG transportation, be that raw CNG, part processed CNG or clean CNG—processed to a standard deliverable to the end user, e.g. commercial, industrial or residential.

CNG can include various potential component parts in a variable mixture of ratios, some in their gas phase and others in a liquid phase, or a mix of both. Those component parts will typically comprise one or more of the following compounds: $C_2H_6$, $C_3H_8$, $C_4H_{10}$, $C_5H_{12}$, $C_6H_{14}$, $C_7H_{16}$, $C_8H_{18}$, C9+ hydrocarbons, $CO_2$ and $H_2S$, plus potentially toluene, diesel and octane in a liquid state, and other impurities/species.

The present invention has therefore been described above purely by way of example. Modifications in detail may be made to the invention within the scope of the claims appended hereto.

What is claimed:

1. A method of fabricating a pressure vessel, comprising:
   providing a vessel liner;
   winding a filamentous material onto the vessel liner, wherein:
   the filamentous material is impregnated with a prepolymer composition prior to being wound onto the vessel liner, or the filamentous material is dry-wound onto the vessel liner and is then impregnated with a prepolymer composition;

wherein:

the prepolymer composition comprises dicyclopentadiene that is at least 92% pure, a reactive ethylene monomer and a curing catalyst, the reactive ethylene monomer comprising a weight percentage of the total monomer content of the prepolymer composition such that the prepolymer composition has a preselected viscosity at a preselected deposition temperature; and curing the impregnated, wound filamentous material to form a polymeric composite;

wherein the reactive ethylene monomer comprises from about 1 wt % to about 10 wt % of the total monomer content; and wherein the reactive ethylene monomer is 5-hexylnorbornene, 5-decylnorbornene, or combination thereof.

2. The method of claim 1, wherein the vessel liner comprises a metal, a ceramic, a thermoplastic polymer or a thermoset polymer.

3. The method of claim 1, wherein the reactive ethylene monomer is 5-hexylnorbornene.

4. The method of claim 1, wherein the reactive ethylene monomer is 5-decylnorbornene.

5. The method of claim 1, wherein the preselected deposition temperature is 70° F. to 75° F. and the amount of 5-hexylnorbornene or 5-decylnorbornene is 4 wt % to 6 wt % of the total monomer content of the prepolymer composition.

6. The method of claim 1, wherein the curing catalyst is selected from the group consisting of ROMP catalysts.

7. The method of claim 1, wherein the impregnated filamentous material is 10 vol % to 90 vol % of the deposited prepolymer composition.

8. The method of claim 1, wherein the filamentous material is selected from the group consisting of glass filament, carbon filament, aramid filament and ultra high molecular weight polyethylene filament.

* * * * *